United States Patent [19]
Haas

[11] 3,894,793
[45] July 15, 1975

[54] LIQUID CRYSTAL IMAGING SYSTEM USING TRIBUTYLTIN OXIDE OR TRIBUTYLTIN CHLORIDE

[75] Inventor: Werner E. L. Haas, Webster, N.Y.

[73] Assignee: Xerox Corporation, Stamford, Conn.

[22] Filed: Oct. 7, 1974

[21] Appl. No.: 513,003

[52] U.S. Cl. ............ 350/160 LC; 96/1 R; 252/299
[51] Int. Cl. .............................................. G02f 1/16
[58] Field of Search................ 350/160 LC; 96/1 R; 252/299, 408

[56] References Cited
UNITED STATES PATENTS

| | | | |
|---|---|---|---|
| 3,722,998 | 3/1973 | Morse | 355/71 |
| 3,795,516 | 3/1974 | Stohr et al. | 96/1.5 |
| 3,795,517 | 3/1974 | Sutton | 96/1.5 |

*Primary Examiner*—Edward S. Bauer
*Attorney, Agent, or Firm*—James J. Ralabate; David C. Petre; George J. Cannon

[57] ABSTRACT

Nematic liquid crystalline materials are homeotropically aligned by contact with either tributyltin oxide or tributyltin chloride. Electro-optical lifetime of nematic liquid crystalline materials employed adjacent photoconductive layers are extended by contact with tributyltin oxide.

24 Claims, 8 Drawing Figures

3,894,793

LIQUID CRYSTAL IMAGING SYSTEM USING TRIBUTYLTIN OXIDE OR TRIBUTYLTIN CHLORIDE

BACKGROUND OF THE INVENTION

This invention relates to the alignment of nematic liquid crystalline compositions; and, more particularly, to imaging systems employing nematic liquid crystalline materials in contact with an aligning agent.

Recently there has been substantial interest in the discovery of materials which align nematic liquid crystalline materials without adversely affecting the electro-optical lifetime of the nematic liquid crystalline materials. That is, the amount of time that a nematic liquid crystalline material can be subjected to either an electrical field or current prior to degradation of the electro-optical properties of the nematic liquid crystalline materials.

In the nematic liquid crystalline structure the major axes of the molecules lie approximately parallel to each other within local regions or domains, but the orientation of the molecules vary from domain to domain.

Aligning agents known in the art include those which can be added to the liquid crystalline composition such as those disclosed in U.S. Pat. No. 3,656,834 and in U.S. Pat. No. 3,803,050. Aligning agents also include those which are typically coated upon substrates to influence the alignment of molecules of a layer of liquid crystalline composition subsequently coated upon the alignment coating. Known coating alignment materials include, for example, silanes such as alkoxysilanes for homeotropic alignment and additive and coating materials listed in Vol. 61, No. 7, *Proceedings of the IEEE*, page 828, July, 1973 in the article "Surface-Produced Alignment of Liquid Crystals" by Kahn, Taylor and Schonhorn, for both homeotropic and homogeneous alignment. Homeotropic alignment can also be accomplished by the Jannings technique reported in Vol. 21, No. 4 of the *Journal of Applied Physics*, Aug. 15, 1972 in an article "Thin Film Surface Orientation for Liquid Crystals."

Generally speaking, electro-optical systems employing liquid crystalline materials in contact with a photoconductive layer enjoy a wide range of applications but have heretofore been limited in duration of operation due to the interaction of the liquid crystalline material and the photoconductive layer. Prior attempts to prevent or retard degradation of such devices have included the use of a barrier layer such as the cellulose nitrate barrier layer disclosed in U.S. Pat. No. 3,722,998 and the polymer barrier layers disclosed in U.S. Pat. No. 3,795,516 and U.S. Pat. No. 3,795,517.

In new and growing areas of technology such as liquid crystalline imaging, new methods, apparatus, composition, and articles of manufacture are often discovered for the application of the new technology in a new mode. The present invention relates to a novel method of providing an additive which when in contact with a nematic liquid crystalline material homeotropically aligns the nematic and extends the electro-optical lifetime thereof.

SUMMARY OF THE INVENTION

It is, therefore, an object of this invention to provide a novel aligning agent.

It is another object of this invention to provide a novel additive which when in contact with a nematic liquid crystalline composition will extend the electro-optical lifetime thereof when the composition is in contact with a photoconductor.

It is yet a further object of this invention to provide novel liquid crystalline compositions which spontaneously align.

It is still yet a further object of this invention to provide novel liquid crystalline compositions which have extended electro-optical lifetime.

The foregoing objects and others are accomplished in accordance with this invention by providing tributyltin oxide in contact with nematic liquid crystalline materials. Homeotropic alignment of nematic liquid crystalline materials is also provided by contacting the nematics with tributyltin chloride. In use, the tributyltin oxide may be dispersed uniformly throughout the nematic liquid crystalline material or coated upon a suitable substrate and placed in contact with a nematic liquid crystalline material. The tributyltin chloride can also be either uniformly dispersed throughout the nematic liquid crystalline material or coated upon a suitable substrate and then placed in contact with the nematic liquid crystalline material.

BRIEF DESCRIPTION OF THE DRAWINGS

For a better understanding of the invention as well as other objects and further features thereof, reference is made to the following detailed disclosure of preferred embodiments of the invention taken in conjunction with the accompanying drawings thereof, wherein.

DESCRIPTION OF THE PREFERRED EMBODIMENTS

In the instant invention it has been discovered that nematic liquid crystalline compositions which are in contact with tributytin oxide or tributyltin chloride spontaneously become aligned and have a greater tendency to become aligned in an orientation wherein the major axis of the molecules comprising the liquid crystalline material are substantially normal to the plane of the layer of nematic liquid crystalline composition.

Figure 1:
FIG. 1 is a partially schematic, cross-sectional view of a layer of liquid crystals on a substrate.

For example, FIG. 1 illustrates in partially schematic, cross-sectional view, a layer of liquid crystalline material 30 on a suitable substrate 31. Liquid crystalline material comprising the layer 30 itself comprises a number of adjacent domains 32, and within each domain 32, the individual molecules 33 are in a unique locally symmetrical orientation which is characteristic of the orientation of the molecules in the nematic liquid crystalline state.

Figure 2:
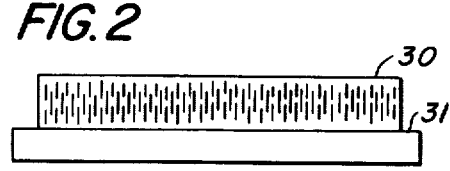
FIG. 2 is a partially schematic, cross-sectional view of a layer of the novel liquid crystalline composition of the instant invention on a suitable substrate.

In FIG. 2, a layer of liquid crystalline composition including the advantageous aligning agent of the instant invention dispersed therein is illustrated wherein any boundaries between domains of molecules of the liquid crystalline material having the local symmetrical orientation are much less definite, and the majority of the individual molecules in the entire layer of liquid crystalline material are aligned with their major axes substantially normal to the plane of the substrate. It is noted that the advantageous aligning agent of the instant invention is not specifically illustrated in FIG. 2. However, these aligning agents are typically present in such small amounts that the illustration of their effect on the molecules of the liquid crystalline material is sufficient to indicate their presence.

Figure 2A:
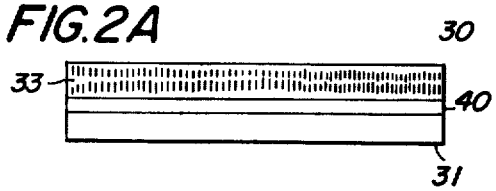
FIG. 2A is a partially schematic, cross-sectional view of a layer of nematic liquid crystalline composition in contact with a layer of the advantageous aligning agent of the instant invention.

In FIG. 2A, a layer of nematic liquid crystalline composition is illustrated resising in contact upon a layer 40 of the advantageous aligning agent of the instant invention.

The individual molecules 33 of the nematic liquid crystalline composition are depicted in FIG. 2A as being substantially parallel to one another and normal to the plane of layer 30 of nematic liquid crystalline composition.

When the novel aligning agent of the instant invention is to be dispersed throughout the nematic liquid crystalline composition, the FIG. 2 embodiment, the following procedure can be conveniently utilized.

The liquid crystalline materials or mixtures thereof along with the advantageous aligning agent are dissolved in a suitable, for example, organic solvents such as chloroform, trichloroethylene, tetrachloroethylene, petroleum ether, methylethyl ketone, isopropanol, toluene, and others. The solution containing the liquid crystalline material and the advantageous additive is then typically poured, sprayed, or otherwise applied to a suitable substrate. After evaporation of the solvent, a thin layer of liquid crystal containing the aligning agent remains on the substrate. Alternatively, the liquid crystalline materials along with the aligning agent may be combined and directly applied to a suitable substrate by heating the mixed components above the isotropic transition temperature of the liquid crystalline components, and mixing the components before application to the substrate. Room temperature liquid crystals may be used in their natural room temperature condition with the advantageous aligning agent mixed therein. In embodiments of the present invention where such liquid solutions of compositions are used in electro-optic cells, such compositions may be injected into position in such electro-optic cells. Many compositions suitable for use herein may have viscosities such that the composition layer may have sufficient integrity to be self-supporting on the substrate regardless of the orientation of the substrate.

The advantageous aligning agents of the present invention are typically added to the nematic liquid crystalline material in amounts in the range between about 1 and about 10% by weight, which amounts are typically sufficient to facilitate the advantageous spontaneous alignment. Any amount less than 1% can be utilized which causes alignment; the upper limit being the amount large enough to cause transition to the isotropic state.

The liquid crystal layers or films suitable for use in the present invention are preferably of a thickness in the range of about 250 microns or less, although thicker films may perform satisfactorily in some embodiments of the instant invention.

When the novel aligning agents are to be utilized as a separate layer, the FIG. 2A embodiment, the above procedure may be utilized to provide a layer of nematic liquid crystalline composition lacking the aligning agent after the layer 40 of novel aligning agent is provided on a suitable substrate. The layer 40 of aligning agent can be conveniently provided by dissolving the aligning agent in an organic solvent such as, for example, petroleum ether. It is to be noted that tributyltin oxide and tributyltin chloride are soluble in most organic solvents. The solution of aligning agent and organic solvent can be conveniently applied to any suitable substrate by any of the aforementioned techniques and the solvent allowed to evaporate such as, for example, by air drying to leave a residual film of aligning agent upon the substrate. The relative concentrations of aligning agent ot organic solvent is typically characterized by the addition of 1 gram of aligning agent to a volume of organic solvent up to about 30 cc. It will be appreciated, of course, that for any given nematic liquid crystalline composition, the concentration of aligning agent in organic solvent can be employed so long as the desired effect is obtained.

For example, in the FIG. 2A embodiment, butyltin oxide has an aligning effect on an about ½-mil thick layer of N-(p-Methoxybenzylidene)-p-butylaniline (hereinafter, MBBA) when the coating solution of butyltin oxide in organic solvent has a concentration of at least about 1 gram aligning agent in 30 cc organic solvent. On the other hand, when extension of electrooptical lifetime is sought by the inclusion of a layer of butyltin oxide in organic solvent are very effective. For example, 1 gram of butytin oxide in 150 cc of petroleum ether, when air-dried upon a suitable substrate, and incorporated into an electro-optical system with MBBA, extended the electro-optical lifetime of the MBBA-photoconductor system six-fold. In the dispersion of FIG. 2 wherein the butyltin oxide is to be uniformly dispersed in the nematic liquid crystalline composition and wherein the objective is to obtain extended electro-optical lifetime, the butyltin oxide is typically added in amounts ranging from about 0.1 to about 10 percent by weight, which amounts are typically sufficient to provide extended electro-optical lifetime. Any amounts greater than 10% by weight can be utilized so long as it does not cause a transition of the liquid crystalline material from the nematic to the isotropic state.

Any nematic liquid crystalline composition comprising a nematic liquid crystalline material can be utilized in accordance with the practice of the present invention. Typical suitable nematic liquid crystalline materials include p-azoxyanisole, p-azoxyphenetole, p-butoxybenzoic acid, p-methoxycinnamic acid, butyl-p- anisylidene-p-aminocinnamate, anisylidene, para-amino-phenylacetate, p-ethoxybenzylamino-a-methyl-cinnamic acid, 1,4-bis(p-ethoxybenzylidene) cyclohexanone, 4,4'-dihexyl-oxybenzene, 4,4'-diheptyloxybenzene, anisal-p-aminoazo-benzene, anisaldazine, a-benzeneazo-(anisal-$\alpha'$-naphthylamine), n,n'-nonoxybenzetoluidine; anils of the generic group (p-n-alkoxybenzylidene-p-n-alkylanilines), such as p-methoxy-benzylidene-p'-n-butylaniline; nematic compounds of the alkoxybenzylidene-aminoalkylphenone group, such as methoxybenzylidene-amino-butylrophenone and methoxybenzylidene-amino-valerophenone; mixtures of the above and others.

The substrate upon which the nematic compositions and aligning agents of the instant invention spontaneously align may comprise any suitable material, and in various embodiments, may be in any desired form, shape, or orientation. For example, substrate may comprise electrically conductive materials such as copper, brass, aluminum, steel, cadmium, silver, gold, tin, or others. Similarly, the substrate may comprise electrically insulating material such as glass, plastic, papers, ceramics, or other suitable insulators. In still other embodiments, a conductive coating may be coated onto an insulator, for example, NESA glass, which is a partially transparent tin oxide coated glass which is available from Pittsburgh Plate Glass Co. to provide an electrode. Another such electrode comprises aluminized Mylar made up of a Mylar polyester film available from DuPont, having a thin, semi-transparent aluminum coating. Another such electrode comprises Mylar coated with copper or copper iodide. In addition to these representative substrate and conductive materials, any other suitable material may be used.

In another embodiment of the present invention the nematic compositions may be overcoated with any suitable material, typically a transparent material or may be sandwiched between two layers of any desired material. For example, a spontaneously aligned or spontaneously alignable nematic composition on a suitable substrate may be overcoated with a material such as Tedlar, a polyvinyl fluoride, available from DuPont; polyethylene film; polyvinylchloride film; Mylar, a polyester resin film available from DuPont, thin glass plates and sheets, mixtures thereof and others. Such overlayers are typically transparent films.

In the instant invention where the nematic liquid crystalline compositions spontaneously align when placed on a substrate, visual differences appear in the liquid crystalline material in either reflected or transmitted light. For example, the nematic material in the aligned state is more transparent than in the non-aligned state, and contrast between aligned and non-aligned portions of a layer of liquid crystalline material may be enhanced with polarizers or other contrast enhancing means.

Figure 3:
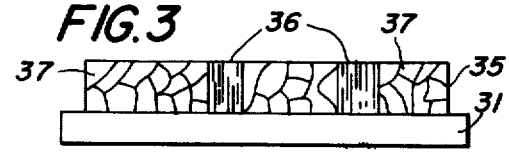
FIG. 3 is a partially schematic, cross-sectional view of an imaging member having imagewise portions comprising the novel liquid crystalline compositions of the instant invention.
Figure 4:
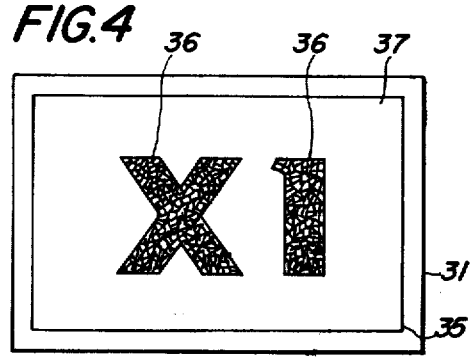
FIG. 4 is a partially schematic top view of the imaging member illustrated in cross-section in FIG. 3.

The differentially optically reflective and transmissive properties of spontaneously aligned and non-aligned portions of a layer of liquid crystalline composition may comprise an imaging system. For example, the imaged member illustrated in FIGS. 3 and 4 comprises substrate 31 supporting liquid crystalline layer 35 comprising imagewise portions 36 which either include or reside on the advantageous aligning agent of the instant invention, and background portions 37 which are in a non-aligned state. Such imagewise layers of liquid crystals may also be used in liquid crystalline electro-optic cells. For example, these liquid crystalline compositions may be used in conjunction with a photoconductive substrate as shown in U.S. Pat. No. 3,671,231.

Electro-optic systems utilizing nematic liquid crystalline compositions provide many effects known to be useful. Such effects include, for example, dynamic scattering as discussed in Proceedings of the E.E.E.E., for July, 1968 in an article entitled: "Dynamic Scattering: A New Electro-Optical Effect in Certain Classes of Nematic Liquid Crystals" by Heilmeier, Zanoni and Barton at pages 1162–1171; transition from optical uniaxiality to optical biaxiality as disclosed in U.S. Pat. No. 3,687,515, herein expressly incorporated by reference; and, the electrical field driven transition from one optical uniaxial orientation to another optical uniaxial orientation as disclosed in copending application Ser. No. 349,497 filed Apr. 9, 1973, hereby expressly incorporated by reference. It will be appreciated that these electro-optical effects are illustrative only and the applications of the present invention are not limited thereto.

Figure 5:
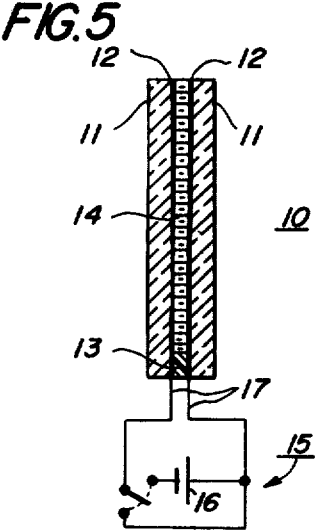
FIG. 5 is a partially schematic, cross-sectional view of a liquid crystalline electro-optic cell.
Figure 6:
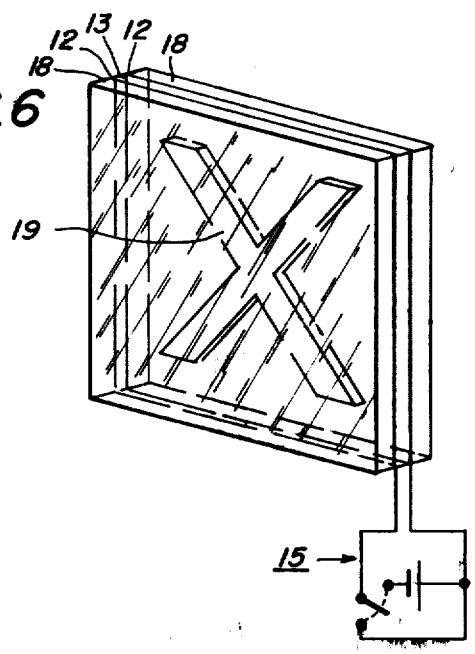
FIG. 6 is a partially schematic isometric view of an embodiment of a liquid crystalline electro-optic imaging cell wherein the desired image is defined by the shape of the liquid crystalline material as confined by the shape of the spacing member.
Figure 7:
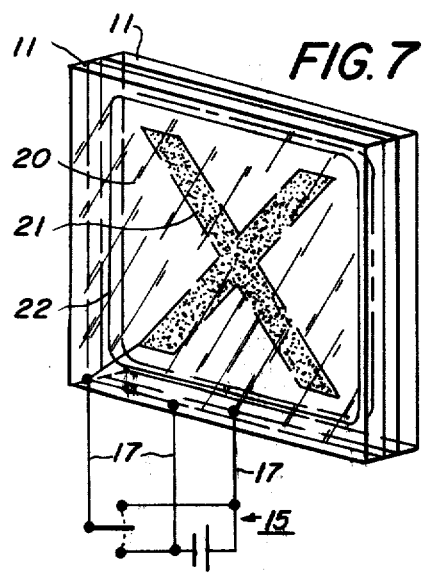
FIG. 7 is a partially schematic isometric view of an embodiment of a liquid crystalline electro-optic imaging cell wherein the desired image is defined by the shape of at least one of the electrodes.

Referring now to FIG. 5 through 7, like numerals refer to like members throughout the figures. FIG. 5 schematically illustrates a layer 14 of nematic liquid crystalline composition sandwiched between two electrodes, each electrode comprising a substrate 11 overcoated with a conductive coating 12. Layer 14 is contained by spacer 13. Conductive coatings 12 are electrically conducted by electrical network 15 to a suitable voltage source 16 by electrical leads 17. Spacer 13 is typically chemically inert, transparent, substantially insulating and has appropriate dielectric characteristics. Materials suitable for use as insulating spacer 13 include cellulose acetate, cellulose triacetate, cellulose acetate butyrate, polyurethane elastomers, polyethylene, polypropylene, polyesters, polystyrene, polycarbonate, polyvinylfluoride, polytetrafluoroethylene, polyethylene terephthalate, and mixtures thereof. Spacer 13 is preferably of a thickness in the range of about 100 microns or less, although the thicker spacers can be satisfactorily employed.

In FIGS. 5 through 7 the layer of nematic liquid crystalline composition is depicted as containing the advantageous aligning agent (not shown) of the present invention. However, it will be understood that in all of the embodiments of the present invention, the aligning agent can be included as a separate layer in contact with the nematic liquid crystalline composition but not dispersed therein.

The embodiment depicted in FIG. 6 has suitable substrates 18 overcoated with conductive coatings 12, spacer member 13 having a void or cutout portion 19 which contains the liquid crystalline composition. The FIG. 6 embodiment thereby has an imagewise configured layer of nematic liquid crystalline composition subjected to the application of voltage uniformly thereacross. This is to be contrasted with the FIG. 1 embodiment wherein a uniform layer of nematic liquid crystalline composition is subjected to a voltage applied uniformly thereacross.

The FIG. 7 embodiment is one in which the desired image is defined by the shape of an electrode 21. The imaging member here comprises transparent plates 11 separated by spacer 13 having void area 20 filled with a nematic liquid crystalline composition and comprising substantially the entire area of spacer 13. The desired image is defined by the shape of the substantially transparent conductive coating 21 which is affixed to the inner surface of one or both of the transparent support plates 11, and is affixed only in the desired image configuration. It will be understood that both electrodes can easily be made in a matched pair to define the same desired image, although only one conductive coating need be in imagewise configuration. In operation, the FIG. 7 embodiment subjects the nematic liquid crystalline composition to an applied voltage only in areas common to the two electroded surfaces of substrates 11. It will be appreciated by those skilled in the art, that the aligning agent may be provided in imagewise configuration as a separate layer and together with a uniform layer of nematic liquid crystalline composition and the application of voltage uniformly across the nematic layer, imagewise electro-optic effects will be provided due to the imagewise configuration of the aligning agent.

It will be appreciated, of course, that the electro-optical embodiments depicted in FIGS. 5 through 7 are preferably employed in dynamically scattering the nematic liquid crystalline composition. This is so because the aligning agent homeotropically aligns the molecules of the nematic liquid crystalline composition which provides the major axes of the nematic composition parallel to the direction in which the voltage is applied. When electro-optical effects other than dynamic scattering are desired, the voltage can be applied in a direction orthoganol to the optic axis of the nematic liquid crystalline composition by means disclosed in U.S. Pat. No. 3,687,515 or the nematic liquid crystalline composition can be chosen to have a net negative dielectric anisotropy which will cause the molecules of the composition to align perpendicular to the direction to which the voltage is applied.

Typical suitable nematic liquid crystalline materials having negative dielectric anisotropy which can be used alone or in conjunction with nematic liquid crystalline materials having a positive dielectric anisotropy, but in amounts which provide to the mixture a net negative dielectric anisitropy, include: N-(p-Methoxybenzilidene)-p-butylaniline (MBBA); p-azoxyanizole (PAA), N-(p-Ethoxy-benzilidene-p-butyl aniline (EBBA); dl-4-(2-methylhexyl)-4'-ethoxy-α-chloro-transstilbene; p-methoxybenzilidene-p'-aminophenyl-3-methyl valerate (MBV); p-ethoxybenzilidene-p'-aminophenyl-3-methyl valerate; pp'-methoxy pentytolane (MPT); pp'-propoxyheptyltolane (PHT); pp'-dioctoxytolane (DOT), trans-4-butyl-α-chloro-4'-ethoxystilbene and phase IV and phase V of nematic liquid crystalline phases available under the trademark Licristal from EM Laboratories, Inc. Phase IV is a eutectic mixture of

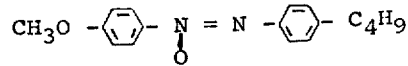

and

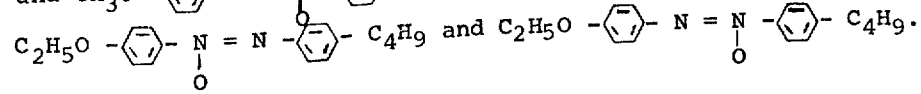

In embodiments of the present invention where optical input is desired to be provided in imagewise configuration in order to alter the voltage applied across the nematic liquid crystalline composition, a photoconductive layer is included in the electro-optical system between the liquid crystalline composition and the conductive coating of one of the electrodes. More particularly, in embodiments where the aligning agent is to be provided as a separate layer and not dispersed in the nematic liquid crystalline composition, the layer of aligning agent is provided between the liquid crystalline composition and the photoconductive layer.

Typical suitable photoconductive materials include photoconductive inorganic materials and photoconductive organic materials. Typical suitable inorganic photoconductive materials include sensitized zinc oxide, for example, sensitized by the addition of Rhodamine Dye, available from Dupont; selenium, selenium alloyed with arsenic such as, for example, arsenic triselenide, tellurium, antimony or bismuth; cadmium sulfide, cadmium sulfoselenide, and the many other typical suitable inorganic photoconductive materials listed in U.S. Pat. No. 3,121,006 to Middleton et al. and listed in U.S. Pat. No. 3,288,603, both of which patents are hereby incorporated by reference. Typical suitable organic photoconductive materials include, for example, the combination of 2,5-bis(p-aminophenyl)-1,3,74-oxadiazole available under the trademark TO 1920 from Kalle and Company, Wiesbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinylcarbazole, available under the trademark Luvican 170 from Winter, Wolf and Company, New York, N.Y.. The thickness of the photoconductive layer is not critical to the practice of the invention. Typical suitable thicknesses are from about 1 to about 100 microns.

It will be appreciated, of course, that the optical input includes a wavelength of radiation which is actinic to the photoconductive material. That is, the wavelength of radiation is within the fundamental absorption band of the photoconductive material utilized.

The following examples further specifically describe preferred embodiments of the present invention. Parts and percentages are by weight unless otherwise noted.

EXAMPLE I

Several samples of nematic liquid crystalline composition comprising the nematic liquid crystalline material MBBA doped with varying amounts of bis-(tri-n-butyl) tin oxide, available from M and T Chemicals, Inc. of Rahway, N.J., are prepared, and separately spread in a thin film on separate standard microscope slides. Compositions comprising about 1, 2, and 3% by weight of the tributyl tin oxide do not exhibit homeotropic alignment. Samples comprising from about 5 to about 12 percent by weight of the tributyltin oxide exhibit homeotropic alignment. Samples containing tributyltin oxide in amounts greater than about 12% by weight exhibit isotropism.

EXAMPLE II

Three samples of nematic liquid crystalline composition comprising N-(p-Ethoxybenzylidene)-p-butylaniline (hereinafter EBBA) and 15, 23, and 40 percent by weight of the tributyltin oxide of Example I (hereinafter, TBTO) are prepared. The samples are separately spread in a thin film on separate microscope slides. The samples containing 15% and 23% by weight TBTO exhibit homeotropic alignment. The sample containing 40% by weight TBTO exhibits isotropism.

The Examples 1 and II demonstrate that TBTO homeotropically aligns nematic liquid crystalline materials when dispersed uniformly therein to form a nematic liquid crystalline composition. Generally speaking, it has been observed that the higher the nematic to isotropic transition temperature, the larger the amount of aligning agent by weight can be included without causing a transition from the nematic to the isotropic state.

EXAMPLE III

Three samples of nematic liquid crystalline compositions comprising the nematic liquid crystalline material MBBA and about 1, 3, and 5% by weight of tributyltin chloride are prepared, and each separate sample is spread in a thin film on separate standard microscope slides. The sample comprising about 1% by weight tributyltin chloride does not exhibit homoetropic aliignment. The sample comprising about 3% by weight tributyltin chloride exhibits partial alignment. The sample comprising about 5% by weight tributyltin chloride exhibits isotropism.

Example III demonstrates that tributyltin chloride can be uniformly dispersed in a nematic liquid crystalline material to form a nematic liquid crystalline composition which exhibits an increased tendency to assume the homeotropic alignment when placed upon a substrate.

EXAMPLE IV

About 1 gram of TBTO is added to each of five quantities of petroleum ether: about 30 cc, 60 cc, 90 cc, 120 cc, and 150 cc. Each of the sample solutions is separately coated in a thin film on a separate microscope slide and allowed to air-dry. The petroleum ether organic solvent evaporates during air-drying leaving a residual thin film of TBTO upon the microscope slide. Subsequent to air-drying, one drop of MBBA is placed on top of the TBTO-coated microscope slides. Homeotropic alignment is exhibited on the sample prepared from a concentration of about 1 gram agent in 30 cc solvent. The remaining samples do not exhibit homeotropic alignment.

Example IV demonstrates that the aligning agent can be provided as a separate layer in contact with the nematic liquid crystalline material to homeotropically align the nematic material.

EXAMPLE V

An electro-optic system comprising a photoconductive layer is prepared as follows: two electrodes are prepared by coating 2 × 2 inch glass slides with conductive coatings of indium oxide; the indium oxide coating of one of the electrodes is overcoated by vacuum evaporation techniques with arsenic triselenide at a thickness of about 8 microns; an about ½-mil thick Tedlar spacer is placed atop the arsenic triselenide layer; and, the other electrode is placed with its indium oxide coating in contact with the spacer. The effective spacer void had an area of about 7 cm². The nematic liquid crystalline material MBBA is introduced into the spacer void. The indium oxide coatings are electrically connected to an about 100 volt source. Upon application of the voltage across the nematic material, dynamic scattering is exhibited. The voltage is left on and the sample observed. After about 3½ hours the dynamic scattering exhibits degradation.

The following procedure is repeated with the exception that the MBBA is mixed with TBTO yielding a nematic liquid crystalline composition comprising about 1.6% by weight TBTO. Upon application of the about 100 D.C. volts, dynamic scattering is exhibited. The voltage is left on and the dynamic scattering observed. After about 12 hours the dynamic scattering exhibits degradation.

EXAMPLE VI

The procedures outlined in Example V are repeated, both with and without the addition of TBTO to the nematic liquid crystalline material with the exception that a nematic dynamic scattering mixture is substituted for the MBBA. The nematic liquid crystalline composition is Dynamic Scattering Mixture No. 1, available from Eastman Chemical Co., Inc., Rochester, New York, and has the following characteristics:

Catalogue Number: 11643
Name: Nematic Mixture, Dynamic Scattering, 1
Typical Lot Data:
  Nematic range: 9° to 99°C
  Dielectric anisotropy (at 0.05 $V_{pp}$, 1.0 KHz, 25°C):

$$\epsilon \perp / \epsilon \| = 1.32$$

$$\epsilon \| - \epsilon \perp = 1.65$$

Resistivity (at 35.4 $V_{rms}$, 500 Hz, 23°C):

$$2.9 \times 10^9 \text{ ohm-cm}$$

Threshold voltage: 8.1 $V_{rms}$ (60 Hz sine wave)
Initial transmission: 80% (homogeneous alignment).

In the experiment without the TBTO, dynamic scattering was observed for about 10 hours and 10 minutes prior to degradation. In the experiment wherein the nematic liquid crystalline composition included the TBTO dispersed therein, dynamic scattering was observed for about 37 hours prior to degradation.

Examples V and VI demonstrate that TBTO can be uniformly dispersed in a nematic liquid crystalline composition to provide an extension of the electro-optical lifetime of the composition.

EXAMPLE VII

The procedure of Example V is followed except that the TBTO is not dispersed in the nematic liquid crystalline material MBBA, but rather is coated upon the arsenic triselenide photoconductive layer by air-drying from a solution of agent and organic solvent. Five electro-optic cells are constructed, each having a coating of TBTO on the photoconductive layer formed from air-drying a different concentration of agent dissolved in petroleum ether. The five solutions each comprise about 1 gram of TBTO dissolved in one of the following volumes of petroleum ether: about 30, 60, 90, 120 and 150 cc.

For each of the separate electro-optic cells, one drop of a particular concentration of TBTO solution is placed on top of the arsenic triselenide photoconductive layer and one drop of the same concentration of solution is placed on the free indium oxide coating (the second electrode).

These drops are substantially immediately uniformly adsorbed on the surfaces to which they are applied, thereby performing a substantially uniform coating of TBTO over the surfaces of which they are applied. The electro-optic cell is then sandwiched to provide the structure described in Example V.

The indium oxide coatings are electrically connected to about 100 D.C. volts. Upon application of the D.C. volts dynamic scattering was exhibited and observed without degradation for the following time periods:

| TBTO Coating Solution Concentration | Dynamic Scattering without Degradation |
|---|---|
| 1 g/30 cc | 72 hours |
| 1 g/60 cc | 67 hours |
| 1 g/90 cc | 72 hours |
| 1 g/120 cc | 22 hours |
| 1 g/150 cc | 22 hours |

EXAMPLE VIII

The procedure of Example VII is followed except that the nematic liquid crystalline material is the aforementioned Dynamic Scattering Mixture No. 1 available from Eastman Chemical Co., Inc. rather than the MBBA. The same five concentrations of TBTO coating solutions are utilized in preparing five electrooptic cells. The procedure of Example VII is otherwise followed in every detail. In all five resulting electro-optic cells, dynamic scattering was exhibited without degradation for a period of time of from about 53 hours to 68 hours.

The results obtained in Examples VII and VIII compares most favorably with the relatively low electro-optic lifetime of the nematic liquid crystalline compositions. For example, without the TBTO, MBBA had a lifetime of about 3½ hours and the Dynamic Scattering Mixture had a lifetime of about 10 hours and 10 minutes.

Although specific components, proportions, arrangements and conditions have been stated in the above description of preferred embodiments of this invention, other suitable materials and procedures such as those listed above, may be used with satisfactory results, and variations in the system may be made to synergize, and enhance, or otherwise modify the properties of or increase the uses for the inventive system. It will be understood that such other changes in the details, materials, steps, arrangements of parts and used which have been herein described and illustrated in order to explain the nature of the invention will occur to and may be made to those skilled in the art upon a reading of this disclosure, and such changes are intended to be included within the principal and scope of this invention.

What is claimed is:

1. An electro-optic device, comprising between two electrodes a nematic liquid crystalline composition in contact with a material selected from the group consisting of tributyltin oxide and tributyltin chloride.

2. The device according to claim 1 wherein said material selected from said group is uniformly dispersed within said liquid crystalline composition.

3. The method according to claim 1 wherein said material selected from said group is in layer configuration.

4. The device according to claim 3 wherein said layer of material is in imagewise configuration.

5. The device according to claim 1 wherein one of said electrodes is in imagewise configuration.

6. The device according to claim 1 wherein said nematic liquid crystalline composition is provided in imagewise configuration.

7. The device according to claim 1 further including between one of said electrodes and said nematic liquid crystalline composition a layer of photoconductive material.

8. The device according to claim 7 wherein said photoconductive material comprises arsenic triselenide.

9. The method of homeotropically aligning a nematic liquid crystalline composition comprising:
  a. providing a substrate; and
  b. providing on said substrate a nematic liquid crystalline composition in contact with a material selected from the group consisting of tributyltin oxide and tributyltin chloride.

10. The method according to claim 9 wherein said material selected from said group is uniformly dispersed within said liquid crystalline composition.

11. The method according to claim 9 wherein said material selected from said group is provided in layer configuration.

12. The method according to claim 11 wherein said material selected from said group is provided in imagewise configuration.

13. The method according to claim 9 wherein said nematic liquid crystalline composition is provided in imagewise configuration.

14. A method for imaging a nematic liquid crystalline composition, comprising:
  a. providing between two electrodes, said nematic liquid crystalline composition in contact with a material selected from the group consisting of tributyltin oxide and tributyltin chloride; and
  b. applying a voltage across said composition wherein the optical properties of said nematic liquid crystalline composition are changed in areas thereof subjected to said applied voltage; one of said nematic liquid crystalline composition and said applied voltage being provided in imagewise configuration.

15. The method according to claim 14 wherein said nematic liquid crystalline composition is provided in imagewise configuration.

16. The method according to claim 14 wherein said voltage is applied in imagewise configuration.

17. The method according to claim 14 wherein said material selected from said group is uniformly dispersed within said nematic liquid crystalline composition.

18. The method according to claim 14 wherein said material selected from said group is provided in layer configuration.

19. The method according to claim 14 further including between one of said electrodes and said nematic liquid crystalline composition a layer of photoconductive material and further including in the performance of step (b) the step of irradiating said photoconductive material with actinic radiation in imagewise configuration.

20. The method according to claim 19 wherein said photoconductive material comprises arsenic triselenide.

21. A method for imaging a nematic liquid crystalline composition, comprising
   a. providing between two electrodes, a nematic liquid crystalline composition in contact with an imagewise configured layer of material selected from the group consisting of tributyltin oxide and tributyltin chloride; and
   b. applying a voltage across said nematic liquid crystalline composition wherein the optical properties of said nematic liquid crystalline composition at least in areas thereof corresponding to said imagewise configured layer of said material selected from said group are changed upon being subjected to said applied voltage.

22. A nematic liquid crystalline composition comprising a nematic liquid crystalline material and tributyltin oxide, said oxide present in an amount effective to extend the electro-optical lifetime of said nematic liquid crystalline material.

23. A nematic liquid crystalline composition comprising at least about 0.1% by weight tributyltin oxide and a nematic liquid crystalline material.

24. The composition of claim 23 wherein said tributyltin oxide is present in an amount up to about 10% by weight of the nematic liquid crystalline composition.

* * * * *